United States Patent
Engdal et al.

(10) Patent No.: US 10,981,544 B2
(45) Date of Patent: Apr. 20, 2021

(54) WIPER ASSEMBLY

(71) Applicant: Volvo Truck Corporation, Gothenburg (SE)

(72) Inventors: Sara Engdal, Gothenburg (SE); Francois Moreau, Bron (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/640,527

(22) PCT Filed: Aug. 21, 2017

(86) PCT No.: PCT/EP2017/071049
§ 371 (c)(1),
(2) Date: Feb. 20, 2020

(87) PCT Pub. No.: WO2019/037833
PCT Pub. Date: Feb. 28, 2019

(65) Prior Publication Data
US 2020/0216038 A1    Jul. 9, 2020

(51) Int. Cl.
*B60S 1/42*    (2006.01)
*B60S 1/34*    (2006.01)
(Continued)

(52) U.S. Cl.
CPC .............. *B60S 1/42* (2013.01); *B60S 1/3415* (2013.01); *B60S 1/3872* (2013.01); *B60S 1/40* (2013.01);
(Continued)

(58) Field of Classification Search
CPC ........ B60S 1/42; B60S 1/3415; B60S 1/3872; B60S 1/524; B60S 1/522; B60S 1/40;
(Continued)

(56) References Cited

U.S. PATENT DOCUMENTS 2,582,717 A    1/1952  Pierce
4,026,581 A *  5/1977  Pasbrig ............... F16L 37/0982
                                                    285/24
(Continued)

FOREIGN PATENT DOCUMENTS

DE    102005060617 A1    6/2007
DE    102011001688 A1    10/2012
(Continued)

OTHER PUBLICATIONS

International Search Report and Written Opinion for International Patent Application No. PCT/EP2017/071049, dated Apr. 20, 2018, 10 pages.

*Primary Examiner* — Gary K. Graham
(74) *Attorney, Agent, or Firm* — Withrow & Terranova PLLC

(57) ABSTRACT

A wiper assembly (100) is provided, comprising a wiper arm (110), a wiper blade (120), and a coupling device (130) configured to enable connection of the wiper blade (120) to the wiper arm (110), wherein the coupling device (130) comprises a first part (140) being connected to one of said wiper arm (110) or said wiper blade (120), and a second part (150) being connected to the other one of said wiper arm (110) or said wiper blade (120). The first part (140) comprises an engaging section (142) being configured to provide an axial fixation of the first part (140) relative the second part (150), and at least one recess (144) configured to provide a rotational fixation of the first part (140) relative the second part (150), and wherein the second part (150) comprises a receiving section (152) configured to receive the engaging section (142) of the first part (140), a locking device (160) arranged radially outwards of said first part (140) and comprising at least one radial protrusion (162) configured to fit with said recess (144) of the first part (140), and a wall (170) surrounding said locking device (160), (Continued)

wherein said wall (170) comprises a constricted section (172) whereby an inner wall (174) of said constricted section (172) is configured to press the radial protrusion (162) radially inwards when the constricted section (172) is axially aligned with the radial protrusion (162).

17 Claims, 8 Drawing Sheets

(51) Int. Cl.
*B60S 1/38* (2006.01)
*B60S 1/52* (2006.01)
*B60S 1/40* (2006.01)
*F16L 37/138* (2006.01)

(52) U.S. Cl.
CPC ....... *B60S 1/524* (2013.01); *B60S 2001/4096* (2013.01); *F16L 37/138* (2013.01)

(58) Field of Classification Search
CPC ...... B60S 1/409; B60S 1/3862; B60S 1/3406; B60S 2001/4096; F16L 37/08; F16L 37/12; F16L 37/138; F16L 37/0841; F16L 37/098; F16L 37/0985; F16L 37/0987
USPC ......... 15/250.32, 250.04; 285/305, 315, 319, 285/DIG. 22; 403/321, 322.1
See application file for complete search history.

(56) References Cited

U.S. PATENT DOCUMENTS

| | | | | |
|---|---|---|---|---|
| 4,451,069 A | * | 5/1984 | Melone | F16L 37/0842 |
| | | | | 285/315 |
| 4,535,500 A | * | 8/1985 | Verton | B60S 1/42 |
| | | | | 15/250.23 |
| 6,893,050 B2 | * | 5/2005 | Schiemann | A47L 9/242 |
| | | | | 285/7 |
| 2012/0246860 A1 | | 10/2012 | Schaeuble et al. | |

FOREIGN PATENT DOCUMENTS

| | | |
|---|---|---|
| EP | 2505440 A2 | 10/2012 |
| EP | 2815932 B1 | 4/2019 |

* cited by examiner

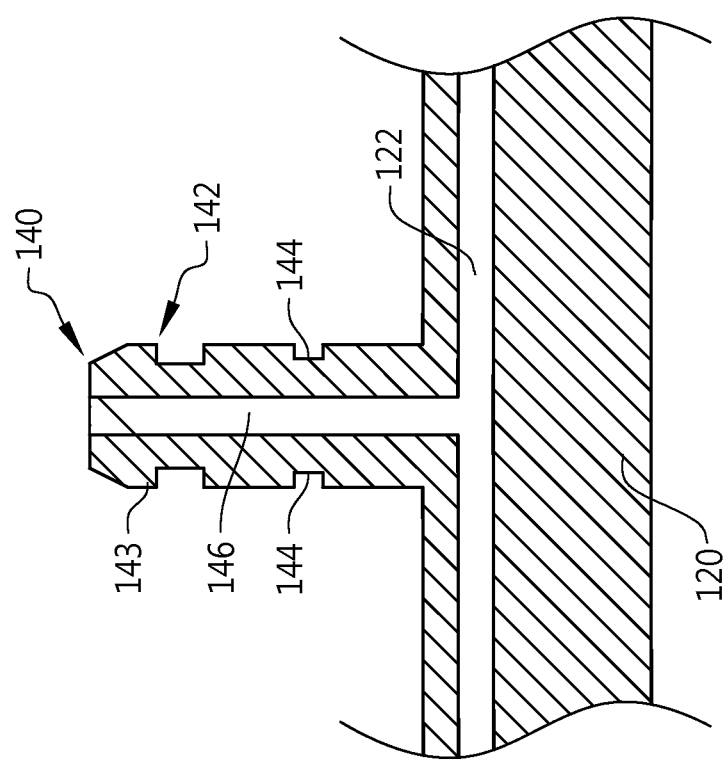

WIPER ASSEMBLY

This application is a 35 USC 371 national phase filing of International Application No. PCT/EP2017/071049, filed Aug. 21, 2017, the disclosure of which is incorporated herein by reference in its entirety.

TECHNICAL FIELD

The invention relates to a wiper assembly, and in particular to a wiper assembly comprising a wiper arm connected to a wiper blade by means of a coupling device. The present invention also relates to such coupling device configured to connect a wiper arm to a wiper blade.

The invention can be applied in heavy-duty vehicles, such as trucks, buses and construction equipment, as well as for other vehicles for which wiper assemblies provide improved visibility through the windshield or any other window. Although the invention will be described with respect to a truck, the invention is not restricted to this particular vehicle, but may also be used in other applications.

BACKGROUND

Vehicles are normally provided with wipers being controlled to remove any unwanted substance, such as rain, snow, ice, etc. from a windshield of the vehicle. Typically the vehicle is also provided with a wiper washing system being configured to discharge a washing liquid onto the window.

A wiper assembly includes a wiper arm and a wiper blade being connected thereto. A motor is driving the wiper arm to pivot, whereby the wiper blade sweeps over the window to remove any substance. For obtaining good cleaning results the wiper blade is provided with a rubber member extending along the wiper blade. Although the rubber blade provides good contact with the window it will eventually wear out, thus requiring replacement of the rubber member. Due to various reasons the rubber member is fixed to the wiper arm, whereby such replacement requires complete removal and replacement of the entire wiper arm.

Different connections between the wiper arm and the wiper blade have been proposed; preferably such connection should not only provide a reliable and robust connection of the wiper blade to the wiper arm, but also allow for an easy and intuitive operation in order for an ordinary vehicle owner to perform the replacement. A common connection includes providing the end of the wiper arm with a U-shape being configured to snap into mating flanges of the wiper blade. Although this connection provides a robust assembly, it is quite difficult to manoeuvre. This problem is quite significant for large vehicles, such as trucks. In such cases the connection between the wiper arm and the wiper blade cannot be accessed from the ground, but instead the person mounting a new wiper blade must climb onto the truck. Hence one hand is preferably used to hold on to the truck, leaving only one hand left for manoeuvring the wiper blade replacement.

Another solution for connecting a wiper blade to a wiper arm is described in EP2815932. This document teaches a wiper assembly having a wiper blade and a wiper arm. The arm and the blade comprise a first and a second adapter element for mounting the blade to the arm. The first adapter element is at one end connected to the wiper blade and at the opposite end connected to the second adapter element, while the second adapter element is at its opposite end connected to the wiper arm.

Various drawbacks are associated with the prior art solutions described above. For example, a user should preferably be able to mount and dismount the wiper blade using one hand only. Additionally, a wiper assembly should preferably provide immediate feedback that a robust connection is established.

An improved wiper assembly, as well as a coupling device for such wiper assembly would therefore be desirable.

SUMMARY

According to a first aspect of the invention, the object is achieved by a wiper assembly according to claim 1. According to a second aspect of the invention, the object is achieved by a coupling device according to claim 12. According to a third aspect of the invention, the object is achieved by a wiper arm according to claim 13. According to a fourth aspect of the invention, the object is achieved by a wiper arm according to claim 14. According to a fifth aspect of the invention, the object is achieved by a wiper blade according to claim 15. According to a sixth aspect of the invention, the object is achieved by a wiper blade according to claim 16. According to a seventh aspect of the invention, the object is achieved by a vehicle according to claim 17.

An object of the invention is therefore to provide a wiper assembly having a coupling device of which a first part has an engaging section being configured to provide an axial fixation of the first part relative a second part. At least one recess is configured to provide a rotational fixation of the first part relative the second part, and the second part comprises a receiving section configured to receive the engaging section of the first part. Yet further a locking device is arranged radially outwards of said first part and comprising at least one radial protrusion configured to fit with said recess of the first part. A wall is surrounding said locking device, and the wall comprises a constricted section whereby an inner wall of said constricted section is configured to press the radial protrusion radially inwards when the constricted section is axially aligned with the radial protrusion.

The locking device may be axially moveable relative the wall, which allows a simple axial movement of the wall and/or locking device in order to provide a rotational fixation of the wiper assembly.

In an embodiment the locking device is slidably supported by said wall, whereby no additional guiding elements are required to allow for the axial movability; instead all components necessary for moving the locking device axially may be incorporated in the wall.

The wall may comprise a proximal section comprising a guiding rail for supporting said locking device. This provides for a simple and robust support of the locking device.

The locking device may comprise at least one resilient member supporting the radial protrusion; the at least one resilient member may be biased radially outwards. This will effectively prevent unintentional rotational fixation of the coupling device unless the locking device is positioned axially correctly relative the wall.

The locking device may comprise a plurality of resilient members spaced apart around the first part, each resilient member supporting an associated radial protrusion. Rotational fixation of the locking device relative the wall is thereby accomplished.

The first part may comprise a washing liquid guide, and the second part may comprise an interior washing liquid channel in fluid connection with the washing liquid guide. This allows for guidance of washing liquid through the coupling device.

In an embodiment the wiper arm comprises a wiper arm washing fluid channel, the wiper blade comprises a wiper blade washing fluid channel, and the coupling device is configured to connect the wiper arm washing fluid cannel with the wiper blade washing fluid channel. Hence distribution of washing liquid may be provided through the wiper blade, thus improving operation of the wiper assembly.

The engaging section may comprise a radial retaining structure, and the receiving section may be configured to fit with said radial retaining structure. The radial retaining structure may e.g. be in the form of a circumferential barb, which allows for an axial fixation of the coupling device.

A wiper arm may be provided, having a first part of the coupling device or a second part of the coupling device attached to it.

A wiper blade may be provided, having a first part of the coupling device or a second part of the coupling device attached to it.

A vehicle is also provided, comprising a wiper assembly.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 4a is a cross-sectional view of a first part of a coupling device according to an embodiment.

DETAILED DESCRIPTION OF EXAMPLE EMBODIMENTS OF THE INVENTION

Figure 1:
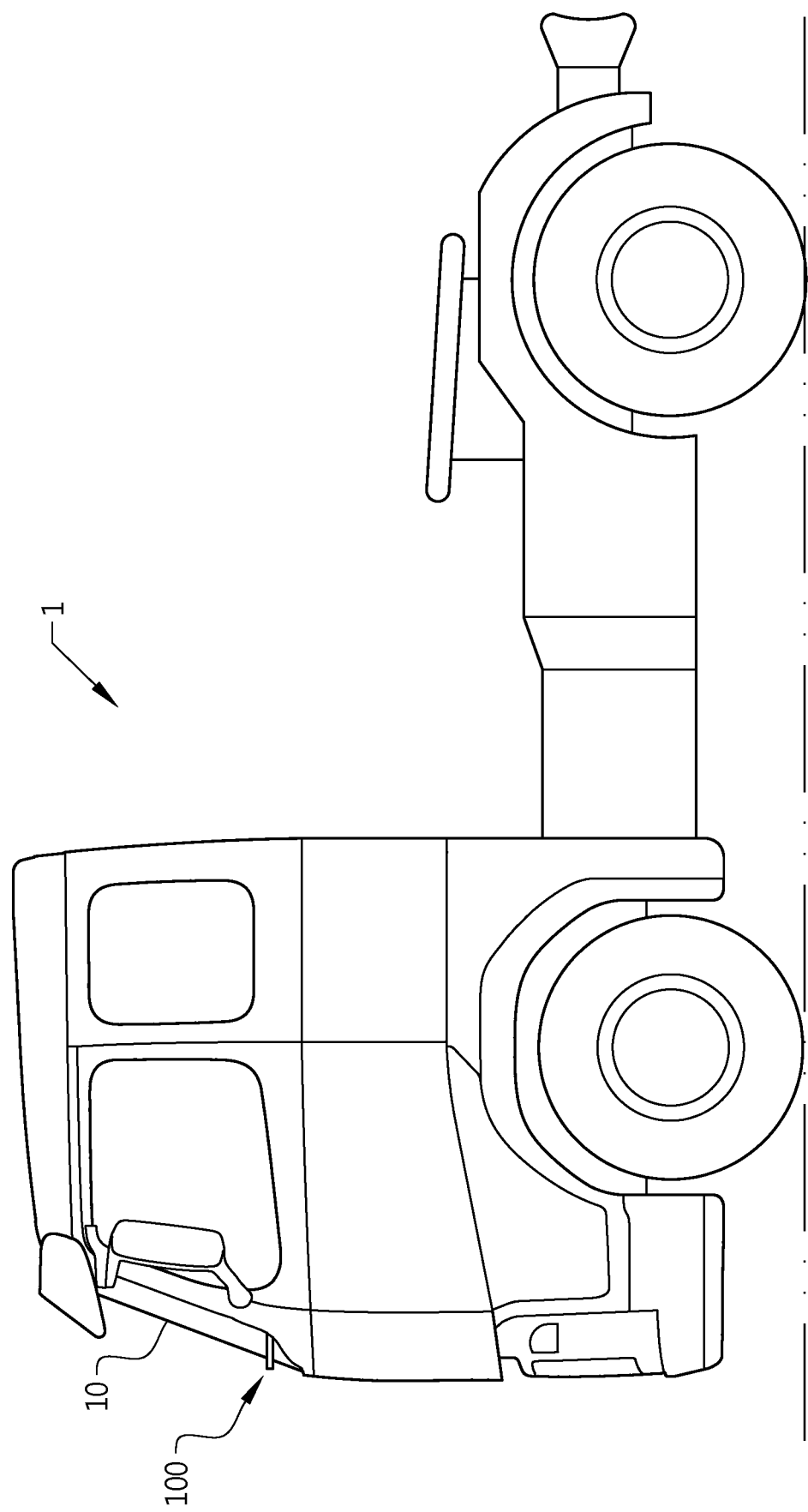
FIG. 1 is a side view of a vehicle according to an embodiment.

Starting with FIG. 1 a vehicle 1 is shown. The vehicle 1, which is illustrated as a truck, has a windshield 10 and at least one wiper assembly 100 arranged at the windshield 10. Upon actuation, the wiper assembly 100 is configured to sweep over the outer surface of the windshield 10 for removing any unwanted substances present thereon.

Figure 2:
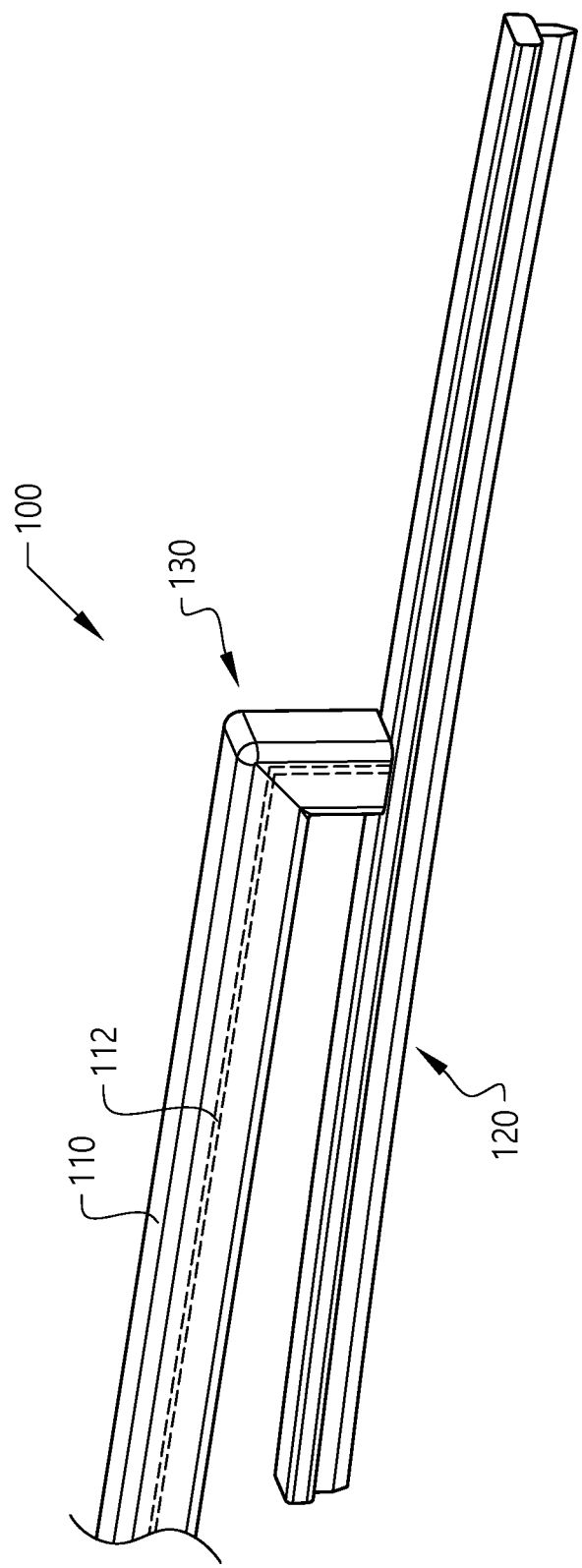
FIG. 2 is an isometric view of a wiper assembly according to an embodiment.

Now turning to FIG. 2 a more detailed view of the wiper assembly 100 is shown. The wiper assembly 100 comprises a wiper arm 110 being at one end pivotally connected to the vehicle 1. The opposite end of the wiper arm 110 is connected to a wiper blade 120 via a coupling device 130. As is shown in FIG. 2 the wiper arm 110 is provided with an interior washing fluid channel 112 for guiding the washing fluid from the vehicle 1 towards the wiper blade 120.

Figure 3:
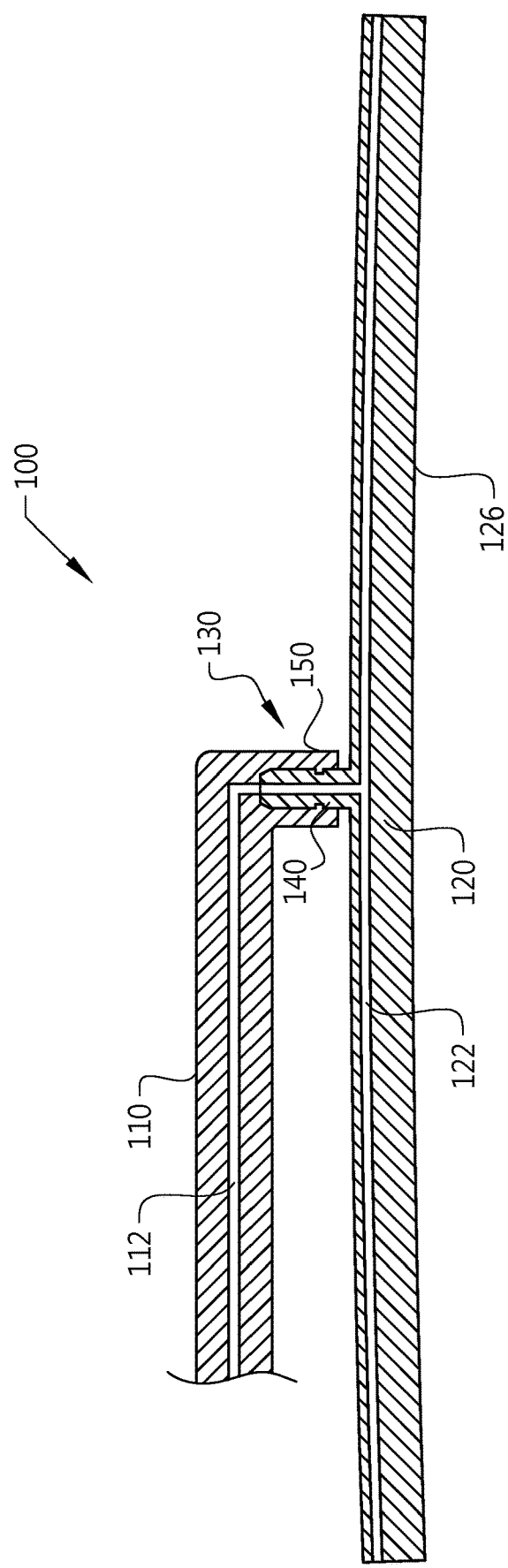
FIG. 3 is a cross-sectional view of the wiper assembly shown in FIG. 2.

As is shown in FIG. 3 the wiper blade 120 is also provided with a washing fluid channel 122 extending along at least a part of the length of the wiper arm 120. Although shown only schematically, the wiper blade 120 is preferably provided with a rubber blade 126 at the edge being assumed to be in contact with the windshield 10.

As is readily understood the wiper blade washing fluid channel 122 receives washing fluid from the wiper arm washing fluid channel 112 and distributes the washing fluid to the windshield 10 via one or more discharge ports (not shown) provided along the length of the wiper blade 120. In order to operate properly washing fluid must also be allowed to pass through the coupling device 130, which comprises a first part 140 and a second part 150 as is indicated in FIG. 3.

Details of the first part 140 of the coupling device 130 are shown in FIG. 4a. The first part 140 is here shown to be connected to the wiper blade 120, however the first part 140 may in other embodiments be attached to the wiper arm 110 instead. The first part 140 may either be formed integrally with the wiper blade 120 (or wiper arm 110), or it may be provided as a separate part which thus needs to be connected to the desired component before being used with the second part 150 of the coupling device 130.

The first part 140 forms a projection out from the wiper blade 120. As is illustrated in FIG. 4a the first part 140 extends approximately perpendicularly from the wiper blade 120, however other connection angles may be possible as well. The cross-sectional shape of the first part 140 may be circular, rectangular, or any suitable shape.

The first part 140 has a distal end forming an engaging section 142. The engaging section 142 may be in the form of a tapered nipple, and it is configured to provide an axial fixation of the first part 140 relative the second part 150 as will be explained in more detail below. The engaging section 142 may also be provided with a radial retaining structure 143, such as in the form of a circumferential barb. The retaining structure 143, which forms a sudden change of the radial extension of the engaging section, may thereby be used to snap lock with the second part 150 in order to ensure the correct axial position of the first part 140 relative the second part 150. Optionally, the radial retaining structure 143 may be omitted and axial positioning of the first part 140 relative the second part 150 may instead be accomplished by means of the distal end of the engaging section 142 reaching and contacting an inner structure of the second part 150.

In addition to the engaging section 142 the first part 140 is also provided with one or more recesses 144. The purpose of the recesses 144 is to allow for a rotational fixation of the first part 140 relative the second part 150. As can be seen in FIG. 4a the first part 140 is provided with two recesses 144 arranged at an angular distance of 180° from each other, but as will be explained with respect to FIG. 5 an increased amount of recesses 144 may be preferred as well.

The recesses 144 are arranged below the engaging section 142, i.e. at an axial position between the engaging section 142 and the wiper blade 120. Preferably the recesses 144 have a well-defined depth such that they will not punctuate a washing liquid guide 146 extending from the distal end of the engaging section 142 to the washing fluid channel 122 of the wiper blade 120. Further, each recess 144 has a limited circumferential extension.

Figure 4B:
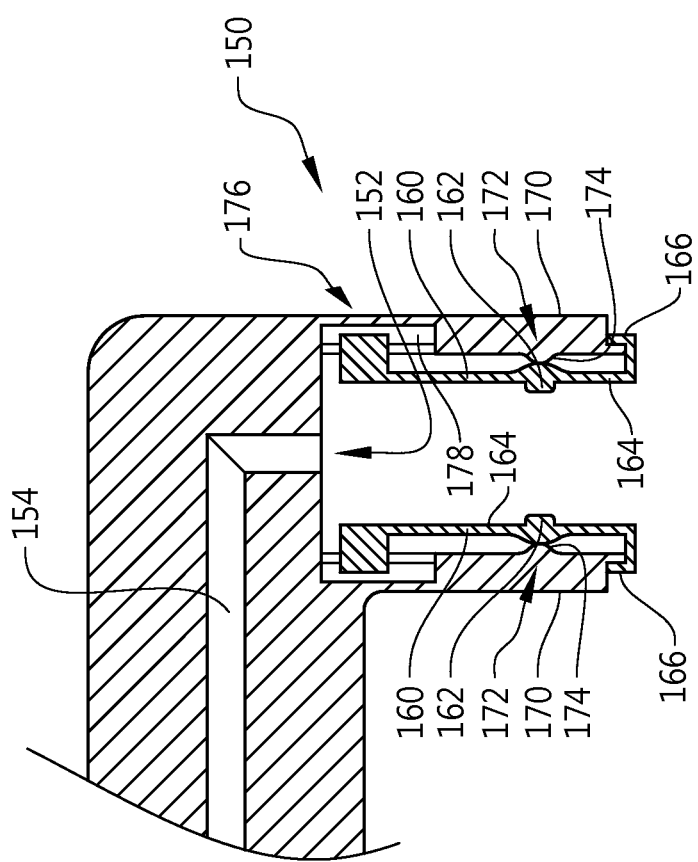
FIG. 4b is a cross-sectional view of a second part of a coupling device according to an embodiment.
Figure 5:
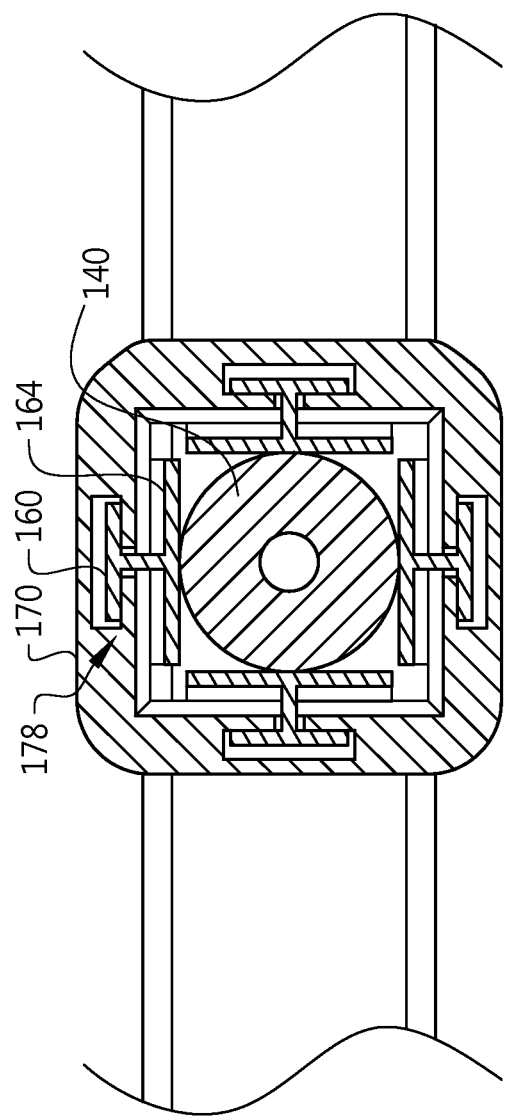
FIG. 5 is a cross-sectional view of the coupling device shown in FIGS. 4a-d.

Now turning to FIG. 4b the second part 150 of the coupling device 130 is shown. The second part 150 is configured to connect with the first part 140 in a robust manner, providing axial as well as radial fixation of the first part 140. For this purpose the second part 150 comprises a receiving section 152, here in the form of a cavity configured to receive the engaging section 142 of the first part 140. Although not shown, the receiving section 152 may be provided with one or more protrusions extending radially inwards for providing a snap locking action with the retaining structure 143 of the first part 140. In the shown example axial alignment of the first part 140 is accomplished by the engaging section 142 of the first part 140 engaging and contacting the bottom of the receiving section 152.

The second part 150 also has an interior washing liquid channel 154. The washing liquid channel 154 of the second part 150 has one end connecting with the fluid channel 112 of the wiper arm, and a second end configured to be in fluid communication with the washing liquid guide 146 of the first part 140.

The second part 150 comprises an outer wall 170, e.g. in the form of a sleeve, which is configured to surround the first part 140. Radially inwards of the wall 170 a locking device 160 is arranged. As can be seen in FIG. 4b the locking device 160 comprises separate resilient members 164, each resilient member 164 having a plate-like shape and extending along the axial extension of the wall 170 of the second part 150. Each resilient member 164, which is allowed to flex radially inwards and outwards as will be explained later, is provided with at least one radial protrusion 162 being configured to fit with an associated recess 144 of the first part 140. In order to control the radial position of the protrusion(s) 162 the wall 170 comprises constricted sections 172 whereby an inner wall 174 of each constricted section 172 is configured to press an associated radial protrusion 162 radially inwards when the constricted section 172 is axially aligned with the radial protrusion 162.

Figure 4C:
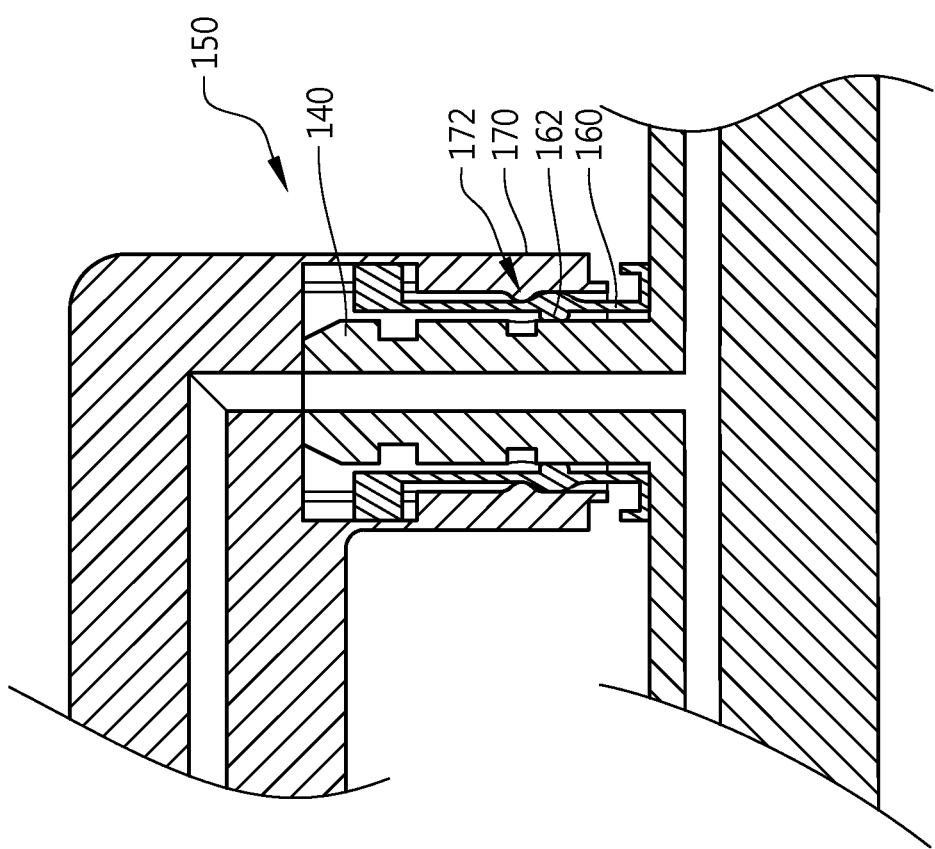
FIG. 4c is a cross-sectional view of a coupling device when arranged in an open position.
Figure 4D:
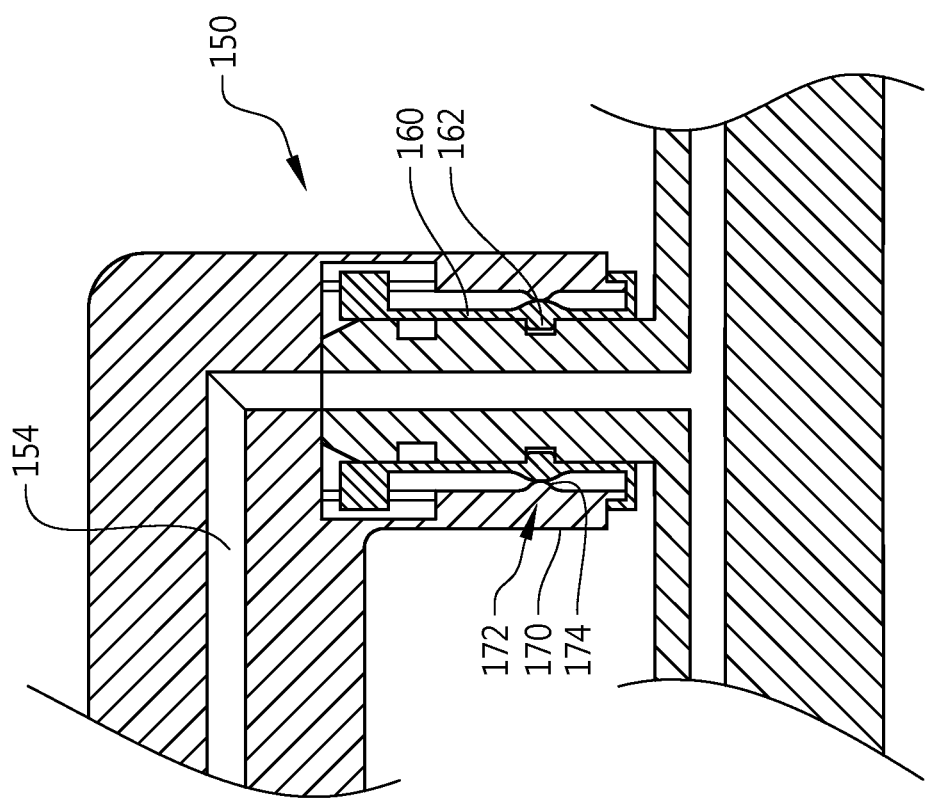
FIG. 4d is a cross-sectional view of the coupling device shown in FIG. 4c when arranged in a closed position.

With reference to FIGS. 4c-d operation of the wiper assembly 100, and in particular the coupling device 130, will be described. Starting in FIG. 4c the first part 140 is inserted into the second part 150 such that the end position is reached. At this position, the first part 140 is axially aligned with the second part 150 but rotation is still allowed.

As can be seen in FIG. 4c for allowing insertion of the first part 140 the resilient members 164 of the locking device 160 are withdrawn from the wall 170 to its maximum position. This outermost position is preferably defined by a guiding rail as explained below with reference to FIG. 5. When the resilient members 164 are arranged in this position they will not engage with the first part 140, and thereby not obstruct the insertion of the first part 140 into the second part 150.

In order to further reduce the risk of unintentional engagement of the first part 140 during insertion, the resilient members 164 are preferably biased radially outwards. In order to secure the position of the first part 140 relative the second part 150 (and consequently the wiper blade 120 relative the wiper arm 110) the second part 150 is pressed downwards onto the first part 140, as illustrated in FIG. 4d. Such axial movement is preferably performed by holding the wall 170, and pressing it in the direction of the wiper blade 120 such that the wall 170 will move relative the resilient members 164 of the locking device 160.

Upon this the constricted region 172 of the wall 170 will align with the radial protrusions 162 of the locking device 160, which then will be urged inwards. As the recesses 144 of the first part 140 are axially aligned with the protrusions 162, they will snap into the recesses thus ensuring a rotational fixation of the first part 140. Should there be a circumferential misalignment between the first part 140 and the second part 150, it will be easy to rotate the first part 140 until the protrusions 162 snap into the associated recesses 144.

The axial end position of the resilient members 164 may be ensured by providing the bottom end of each resilient member 164 with a hook-like structure 166 (see FIG. 4b), which comes into contact with the end of the wall 170 when the locking device 160 is pushed inwards.

The axial alignment of the constricted section 172 relative the radial protrusion 162 is achieved by allowing the locking device 160 to be axially moveable relative the wall 170, and thereby by changing the axial position of the entire locking device 160 relative the wall 170.

Axial movability of the locking device 160 relative the wall 170 is preferably provided by arranging the locking device 160, i.e. the resilient members 164 of the locking device 160, in a sliding manner relative the wall 170. As is shown in FIGS. 4b-d the entire axial length of the resilient members 164 does not need to be slidably supported by the wall 170. Instead, only the upper part of the resilient members 164 is slidably supported by the wall 170. For this the wall 170 comprises a proximal section 176, i.e. an upper portion, comprising a guiding rail 178 for supporting said locking device 160. The guiding rail 178 is further shown in FIG. 5, also showing the cross-sectional shape of the coupling device 130. The first part 140 is here surrounded by four resilient members 164 together forming the locking device 160. The upper portion of each resilient member 164 is formed by a profile having a H-shape being inserted in a corresponding guiding rail 178 of the wall 170. As explained above each resilient member 164 is provided with a radial protrusion arranged approximately at the centre (in the lateral direction) of the resilient member 164 such that they may engage with the recesses 144 of the first part 140.

It is to be understood that the present invention is not limited to the embodiments described above and illustrated in the drawings; rather, the skilled person will recognize that many changes and modifications may be made within the scope of the appended claims.

The invention claimed is:

1. A wiper assembly, comprising a wiper arm, a wiper blade, and a coupling device configured to enable connection of the wiper blade to the wiper arm, wherein the coupling device comprises a first part being connected to one of said wiper arm or said wiper blade, and a second part being connected to the other one of said wiper arm or said wiper blade, wherein the first part comprises an engaging section being configured to provide an axial fixation of the first part relative the second part, and at least one recess configured to provide a rotational fixation of the first part relative the second part, and wherein the second part comprises a receiving section configured to receive the engaging section of the first part, a locking device arranged radially outwards of said first part and comprising at least one radial protrusion configured to fit with said recess of the first part, and a wall surrounding said locking device, wherein said wall comprises a constricted section whereby an inner wall of said constricted section is configured to press the radial protrusion radially inwards when the constricted section is axially aligned with the radial protrusion.

2. The wiper assembly according to claim 1, wherein the locking device is axially moveable relative the wall surrounding said locking device.

3. The wiper assembly according to claim 2, wherein the locking device is slidably supported by said wall surrounding said locking device.

4. The wiper assembly according to claim 3, wherein the wall surrounding said locking device comprises a proximal section comprising a guiding rail for supporting said locking device.

5. The wiper assembly according to claim 1, wherein the locking device comprises at least one resilient member supporting the radial protrusion.

6. The wiper assembly according to claim 5, wherein the at least one resilient member is biased radially outwards.

7. The wiper assembly according to claim 5, wherein the locking device comprises a plurality of resilient members spaced apart around the first part, each resilient member supporting an associated radial protrusion.

8. The wiper assembly according to claim 1, wherein said first part comprises a washing liquid guide, and wherein said second part comprises an interior washing liquid channel in fluid connection with the washing liquid guide.

9. The wiper assembly according to claim 8, wherein the wiper arm comprises a wiper arm washing fluid channel, the wiper blade comprises a wiper blade washing fluid channel, and the coupling device is configured to connect the wiper arm washing fluid cannel with the wiper blade washing fluid channel.

10. The wiper assembly according to claim 1, wherein the engaging section comprises a radial retaining structure, and wherein the receiving section is configured to fit with said radial retaining structure.

11. The wiper assembly according to claim 10, wherein the radial retaining structure is in the form of a circumferential barb.

12. A vehicle, comprising the wiper assembly according to claim 1.

13. A coupling device configured to connect a wiper arm with wiper blade, the coupling device comprises a first part being connectable with one of said wiper arm or said wiper blade, and a second part being connectable with the other one of said wiper arm or said wiper blade, wherein the first part comprises an engaging section being configured to provide an axial fixation of the first part relative the second part, and at least one recess configured to provide a rotational fixation of the first part relative the second part, and wherein the second part comprises a receiving section configured to receive the engaging section of the first part, a locking device arranged radially outwards of said first part and comprising at least one radial protrusion configured to fit with said recess of the first part, and a wall surrounding said locking device, wherein said wall comprises a constricted section whereby an inner wall of said constricted section is configured to press the radial protrusion radially inwards when the constricted section is axially aligned with the radial protrusion.

14. A wiper assembly, comprising:
the coupling device of claim 13; and
a wiper arm attached to the first part of the coupling device.

15. A wiper assembly, comprising:
the coupling device of claim 13; and
a wiper arm attached to the second part of the coupling device.

16. A wiper assembly, comprising:
the coupling device of claim 13; and
a wiper blade attached to the first part of the coupling device.

17. A wiper assembly, comprising:
the coupling device of claim 13; and
a wiper blade attached to the second part of the coupling device.

* * * * *